(12) United States Patent
Jung et al.

(10) Patent No.: US 10,588,258 B2
(45) Date of Patent: Mar. 17, 2020

(54) AUTOMATIC DETERMINATION OF THE CONTROL UNIT PARAMETERS OF AN ARRANGEMENT TO CONTROL AN ACTUATOR FOR THE ADJUSTMENT OF AN ADJUSTABLE ELEMENT OF AN AGRICULTURAL MACHINE

(71) Applicant: Deere & Company, Moline, IL (US)

(72) Inventors: Benedikt Jung, Kaiserslautern (DE); Byron K. Miller, Waterloo, IA (US); Philipp Muench, Kaiserslautern (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/420,532

(22) Filed: Jan. 31, 2017

(65) Prior Publication Data
US 2017/0245434 A1     Aug. 31, 2017

(30) Foreign Application Priority Data
Feb. 25, 2016 (DE) .......... 10 2016 202 964

(51) Int. Cl.
*A01D 41/127* (2006.01)
*A01D 41/14* (2006.01)
(Continued)

(52) U.S. Cl.
CPC .......... *A01D 41/127* (2013.01); *A01B 63/008* (2013.01); *A01B 63/1006* (2013.01); *A01D 41/145* (2013.01); *G05B 6/02* (2013.01)

(58) Field of Classification Search
USPC ........................................................ 701/50
See application file for complete search history.

(56) References Cited

U.S. PATENT DOCUMENTS

| | | | | |
|---|---|---|---|---|
| 4,337,611 A | * | 7/1982 | Mailander | .......... A01D 41/1274 460/6 |
| 4,846,283 A | * | 7/1989 | Batcheller | ............ A01B 63/112 172/10 |

(Continued)

FOREIGN PATENT DOCUMENTS

| | | |
|---|---|---|
| DE | 4431824 C1 | 2/1996 |
| DE | 102014203005 B3 | 5/2015 |

(Continued)

OTHER PUBLICATIONS

Google Patents translation of EP2591660B1 Harvester in particular of root crops (May 15, 2013).*

(Continued)

*Primary Examiner* — Jean Paul Cass
(74) *Attorney, Agent, or Firm* — Rathe Lindenbaum LLP

(57) ABSTRACT

An arrangement for the control of an actuator (48) for the adjustment of an adjustable element (16) of an agricultural work machine (10) is equipped with a control unit (50) to produce adjustment signals for the adjustable element (16) in the sense of moving to a theoretical position, a control arrangement (62) of the actuator (48), coupled with the adjustable element (16), which receives the adjustment signals of the control unit (50), and a determination device (54) to make available at least one parameter (ϑ), determined with the aid of recorded vibration characteristics of the system consisting of the adjustable element (16) and the work machine (10). The determination device (54) can be operated so as to determine at least one parameter (ϑ) at the successively following time points and to supply it to the control unit (50). The parameter (ϑ) serves to optimize the regulating behavior of the control unit (50).

13 Claims, 6 Drawing Sheets

(51) Int. Cl.
*A01B 63/00* (2006.01)
*G05B 6/02* (2006.01)
*A01B 63/10* (2006.01)

(56) References Cited

U.S. PATENT DOCUMENTS

| | | | | |
|---|---|---|---|---|
| 4,942,724 | A | * | 7/1990 | Diekhans ............ A01D 41/141 56/10.2 E |
| 5,359,836 | A | * | 11/1994 | Zeuner ................. A01D 41/141 56/10.2 E |
| 5,365,442 | A | * | 11/1994 | Schmidt ............... A01B 63/114 37/348 |
| 5,666,793 | A | * | 9/1997 | Bottinger ............. A01B 79/005 460/1 |
| 5,704,200 | A | * | 1/1998 | Chmielewski, Jr. ......................... A01D 41/141 56/10.2 E |
| 5,884,204 | A | | 3/1999 | Orbach |
| 6,121,782 | A | * | 9/2000 | Adams ...................... G01F 1/64 324/664 |
| 6,242,927 | B1 | * | 6/2001 | Adams ...................... G01F 1/64 324/663 |
| 7,707,811 | B1 | | 5/2010 | Strosser |
| 2010/0287900 | A1 | * | 11/2010 | Ringwald ............ A01D 41/141 56/17.1 |
| 2010/0332079 | A1 | * | 12/2010 | Wang .................. B60N 2/4242 701/37 |
| 2011/0048829 | A1 | * | 3/2011 | Matsumoto ........... F16H 61/435 180/197 |

FOREIGN PATENT DOCUMENTS

| | | |
|---|---|---|
| EP | 0331893 | 9/1989 |
| EP | 0331893 A2 | 9/1989 |
| EP | 0685151 | 12/1995 |
| EP | 1269823 A1 | 1/2003 |
| EP | 2020170 A2 | 4/2009 |
| EP | 2314147 | 4/2011 |
| EP | 2382853 | 11/2011 |
| EP | 2591660 | 5/2013 |
| EP | 2910097 | 8/2015 |
| WO | 2008088916 A2 | 7/2008 |
| WO | WO20170075002 | 5/2017 |

OTHER PUBLICATIONS

Y. Xie et al., "Fundamental Limits in Combine Harvester Header Height Control", Journal of Dynamic Systems, Measurement, and Control, May 2013, 0345031-0345038 (15 pgs).

EP Search Report for EP Application 17193626.3 dated Feb. 6, 2018.

EP Search Report for EP Application 17193626.2 dated Jul. 13, 2017.

* cited by examiner

AUTOMATIC DETERMINATION OF THE CONTROL UNIT PARAMETERS OF AN ARRANGEMENT TO CONTROL AN ACTUATOR FOR THE ADJUSTMENT OF AN ADJUSTABLE ELEMENT OF AN AGRICULTURAL MACHINE

FIELD OF THE INVENTION

This application claims priority to German Application Ser. No. DE 102016202964.9 filed on Feb. 25, 2016, which is hereby expressly incorporated by reference in its entirety. The invention concerns an arrangement to control an actuator for the adjustment of an adjustable element of an agricultural machine.

BACKGROUND OF THE INVENTION

Generally, agricultural machines comprise elements that can be adjusted with respect to the frame or chassis of the machine by means of associated actuators—that is, they can be linear displaced or pivoted. In the case of a tractor, these elements can comprise a work device that is placed on a front or rear power lift of a tractor, for example, for the processing of the soil, for sowing, or to apply fertilizers or other chemicals—in the case of a self-propelled field sprayer, a height-adjustable spray rod and/or one which can pivot around an axis that extends in a fore-and-aft direction; with a harvester or a field chopper, a harvesting attachment that can move up and down by pivoting around a horizontal axis that extends transverse to the forward direction (generally, this horizontal axis extends through a rotating axle of an upper inclined conveyor roller or chopping cylinder) and/or for the parallel alignment on a lateral incline, around which an axis extending in the forward direction can be swiveled, or an ejection spout of a forage harvester that can be used to adjust the height of its output end around a horizontal axis and/or to adjust the angle around a vertical axis.

The theoretical or nominal (i.e. the commanded or desired) position of the actuator, and thus the commanded or desired position of the adjustable element, is selected by an operator. The operator makes the selection using a suitable operator interface or by means of an automatic control. Thus, for example, the operator can directly command the cutting unit of a harvester to move to a particular height above the ground with an operator interface. Alternatively, the commanded or desired position of the actuator may be provided with the aid of the actual position of the harvester, from a map, in which the cutting unit heights used during the last harvest have been entered (see e.g. DE 44 31 824 C1) in association with a particular location on the ground. As yet another alternative, the commanded or desired position of the actuator, may be generated using the aid of predictive sensors (see e.g. EP 1 269 823 A1) that predict the desired height above the ground.

In these typical prior art cutting unit height control systems, the actual height of the cutting unit above the ground is detected by means of a sensor. The control unit controls the actuator to adjust the height of the cutting unit with respect to the harvester by minimizing the difference between the commanded or desired height and the actual height detected by means of the sensor. Typically, a control unit producing a signal proportional to the sensed height error is used for this. Control units configured in this manner are said to use "proportional control" or to be "proportional controllers".

When the actuator changes the position of the cutting unit (for example, by raising the cutting unit or lowering it, or by lateral tilting it), the sudden movement of the cutting unit gives rise to excitatory moments and forces. These moments and forces are transferred to the frame or chassis of the harvesting machine. Since the harvesting machine is typically supported on large-volume tires or elastically suspended rubber belt tracks, the system (consisting of the harvesting machine and the cutting unit) is excited to mechanical vibrations (e.g. to bounce up and down above the ground or twist back and forth along its longitudinal axis). This bouncing or twisting negatively affects the accuracy of the position of the height and the lateral inclination of the cutting unit.

Therefore, with such control units employing proportional control, it is desirable to select control unit parameters. In particular, the control unit amplification, which determines how suddenly the actuator reacts to a given height error (i.e. the difference between the commanded or desired height and the real height) in such a way that the control unit behavior is optimized. By selecting proper control unit parameters, the actual height is adjusted, as quickly as possible, to the commanded or desired height, without producing excess vibrations or bouncing of the harvesting machine and/or cutting unit.

In the prior art, the control unit amplification parameter is manually entered by the operator into the control unit. A suitable interface is provided to the operator for entering the control unit amplification, in particular, a rotary knob, or with a value based on experience, it is definitely specified (see e.g. Y. Xie et al., "Fundamental Limits in Combine Harvester Header Height Control", Journal of Dynamic Systems, Measurement, and Control, May 2013, 0345031-0345038).

The response characteristics of the control unit, however, are dependent on a number of additional parameters of the system in addition to the control unit amplification, such as soil characteristics, parameters of the tires, the grain tank fill state, parameters of the harvesting attachment, parameters of the hydraulic system, parameters of the machine, etc.). The manual (i.e. operator) solution of adjusting the control unit amplification requires regular adjustment of the control unit amplification in order to accommodate these other parameters of the system as they change over time, traveling through a field. To accommodate these additional parameters of change over time the operator would have to regularly adjust the control unit amplification to attain a compromise among the reaction time, harmonic range, stability, and robustness on the basis of the changing circumstances during operation in an agricultural field.

Typically, however, the operator adjusts the control unit amplification only once for the whole day, which is then followed by a strong performance loss as the machine and field conditions change over time. This degradation in performance may be so extreme that the operator is forced to reduce the machine's harvesting speed (i.e. the machine's speed over the ground) to prevent the vibrations (bouncing). This speed reduction impairs the harvesting performance of the machine and reduces its productivity.

DE 10 2014 203 005 B3 proposes superimposing a time-delayed signal onto the adjustment signal for the height control of an agricultural harvesting attachment, sent by a specification device to an actuator based on theoretical and real values of the height of the cutting unit, in order to diminish the aforementioned vibrations. The amplification and time delay of an amplifier making available the time-delayed signal is determined by means of a determination device, which, before the beginning of the harvesting process and/or during the operation, causes the extension of the actuator for the adjustment of the height of the harvesting attachment.

With the aid of signals provided by a pressure sensor associated with the actuator or provided by an inertia sensor on the cutting unit, the determination device determines the resonant frequency (i.e. the natural frequency of vibration or bouncing) of the harvesting attachment and harvesting machine and determines the appropriate damping of the system, and, with this assistance, the amplification and time delay of the amplifier that makes available the time-delayed adjustment signal. Its amplification can also be specified by the determination device. In this arrangement, therefore, only the adjustment signal supplied to the actuator is modified, and not the adjustment signal made available by the specification device that is used as a control unit.

U.S. Pat. No. 7,707,811 B1 describes a self-propelled swath mower with a front mowing unit and an automatic contact pressure control unit associated with it. In order to determine the weight of the mowing unit, which is needed for the correct control of the contact pressure, the contact pressure control unit investigates whether the mowing unit is in a suitable position so as to determine the pressure in the lifting cylinder of the mowing unit. The position is considered to be suitable if the mowing unit is at a relatively great height above the ground—for example, upon turning in the headland or during road travel. Therefore, only a static parameter of the mowing unit (weight force) is determined here. This control unit is suitable for the adjustment of the contact pressure, but not for the control of the height of a harvesting attachment or another element, since other parameters which characterize its movement behavior have to be determined for this.

EP 0 331 893 A2 describes a combine harvester with a control unit device for the control of the height and the swivel angle of the cutting unit around an axis which extends in the forward direction. The actual height of the cutting unit above the ground is determined by the ground scanner and, based on the difference between the theoretical and actual values of the height of the cutting unit, a microprocessor controls actuators for the adjustment of the aforementioned angles. The hysteresis range and the dead time of the theoretical-to-actual comparison of the control unit device and changes of the control unit characteristics thereby produced are derived from the reactions of the control unit device, wherein the periodicity of the adjustment signals and perhaps the vicinity of the boundary load can be used, and depend on the work conditions, such as the traveling speed, the ground unevenness, and the cutting height. In this way, proportional-differential-integral control units with dynamic parameter adaptation will be attained. Accordingly, control unit parameters in the form of hysteresis and dead time are improved here (iteratively), in that the adjustment signals of the control unit device are detected. The procedure is disadvantageous because the dead time and hysteresis represent only a few of the parameters of the control unit device to be appropriately controlled. It is also disadvantageous because the iterative procedure is based exclusively on the detection of the adjustment signals of the control unit device, which works very indirectly, in a time-delayed manner and is thus subject to errors.

The goal of the invention under consideration is to provide an arrangement for controlling an actuator that adjusts an adjustable element of an agricultural work machine in which the aforementioned disadvantages are entirely or at least to some extent, avoided.

SUMMARY OF THE INVENTION

An arrangement for the control of an actuator that adjusts an adjustable element of an agricultural work machine comprises a control unit adapted or programmed to produce adjustment signals for the adjustable element in the sense of moving the element to a theoretical position (in other words, a commanded or desired position), a control arrangement of the actuator, coupled with the adjustable element, which receives the adjustment signals of the control unit, and a determination device to make available at least one parameter that is determined with the aid of detected vibration characteristics of the system consisting of the adjustable element and the work machine. The determination device can be operated to determine at least one parameter on successive time points and to pass the parameter to the control unit. The parameter acts in the sense of optimizing the behavior of the control unit, Accordingly, the result is an automatic adjustment of the control unit parameter and its regular or constant adaptation, which considerably enhances system performance and driving comfort. In the determination of the parameter, the procedure can be such that first, a virtual, mathematic model of the system, consisting of the adjustable element and the work machine, is defined, which can perhaps be supplemented by a model for the dynamics of the control arrangement and the actuator. With the aid of the detected vibration characteristics of the system consisting of the adjustable element and the work machine, the determination device determines the parameters characterizing the model or the models. Finally, the at least one optimized parameter is determined for the control unit and sent on to it with the aid of these parameters.

The determination device can be operated to determine at least one parameter iteratively or recursively.

The determination device can be operated so as to determine the parameter with the aid of one or more of the following variables and/or to stipulate the parameter in the sense of optimizing one or more of these variables: harmonic range, damping, the increase time, the time at rest, and/or the control unit time of the element.

The determination device can be operated so that, with one or more of the variables, the parameters of the control unit can be stipulated with the adjustment control units or tables.

The determination device can be operated to determine a deviation between an ideal vibration behavior of the system consisting of the adjustable element and the work machine, which is described by a dynamic mathematical model, and the real vibration behavior of the system, and to use the error resulting therefrom for the calculation of a parameter in the sense of minimizing the deviation of the real behavior from the ideal behavior.

The determination device can be operated so that, with the aid of the adjustment signal and a corresponding, determined adjustment of the adjustable element, to determine at least one variable of the control unit section, especially a value representative for the transfer function of the control unit section, for example, by means of a model identification, and with the aid of this variable, to carry out a regulator design in accordance with known control unit-technical methods, and to determine the parameter with the aid of the regulator design.

The control unit device can be operated so as to determine at least one parameter during operation, at the headland or during a calibration—in particular, with rapid adjustment commands which appear during operation—and to send it on to the control unit.

The control unit device can be operated so as to produce test signals from time to time and to superimpose on them the adjustment signals or a theoretical value for the position of the element that is sent on to the control unit.

The control unit device can be operated so as to take into consideration the reaction of the control arrangement and the actuator with respect to a rapid adjustment command in the determination of the parameter, in particular, based on a detection of the reaction of the actuator with respect to a rapid adjustment command or with the aid of an estimate of operating variables of the control arrangement and/or the actuator. In particular, it can hereby be the temperature of the hydraulic oil used there, which has an influence as to how fast the actuator reacts with respect to an adjustment command. In this way, the dynamics of the actual control unit section is taken into consideration.

The adjustable element is, in particular, a work device that is placed on a front or rear power lift of a tractor (for example, for the cultivation of the soil, for sowing, or for the delivery of fertilizers or other chemicals, especially a height-adjustable spraying rod and/or one that can swivel around an axle extending forward), or a height-adjustable axle and/or an axle of a swiveling spray rod of a self-propelled field sprayer that extends forward, or a horizontal harvesting attachment that can be adjusted in the forward direction of a harvesting machine and/or transverse to it or an ejection bend of a field chopper that can be adjusted around a vertical and/or horizontal axle.

BRIEF DESCRIPTION OF THE DRAWINGS

The drawings show four embodiment examples of the invention, described in more detail below, wherein the reference symbols should not be used for a limited interpretation of the patent claims. The figures show the following:

DETAILED DESCRIPTION

Work Machine

Figure 1:
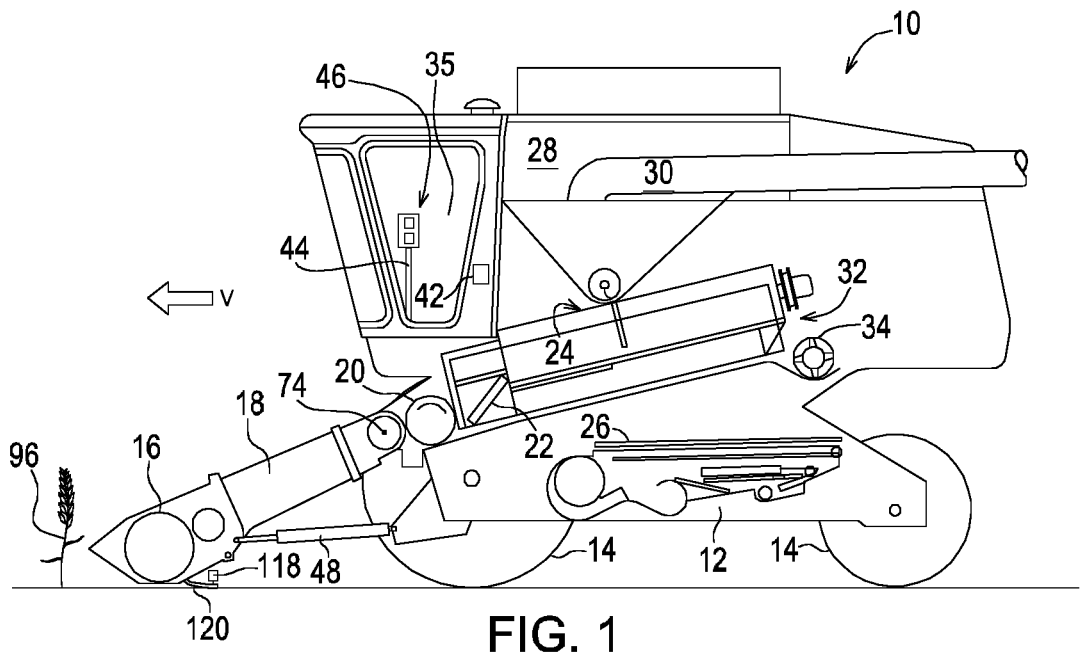
FIG. 1 is a schematic, lateral view of a work vehicle with an adjustable element.

FIG. 1 shows a self-propelled agricultural work machine 10 in the form of a harvesting machine with a supporting structure 12 (here shown as a chassis), which is equipped with wheels 14 having elastic tires which are standing on the ground. Although the work machine 10 is shown with wheels, it could also be equipped with two or four rubber track roller units. A harvesting attachment 16 in the form of a cutting unit is used for the harvesting of crops and it conducts them to an inclined conveyor 18 during the harvesting operation. The inclined conveyor 18 contains a conveying device to take the harvested crops to a lead drum 20. The lead drum 20 conveys the crops upward through an inlet transition section 22 and a rotating crop processing device 24, configured to thresh and separate the crop. The depicted crop processing device 24 is situated axially in the harvesting machine. It could also be situated in other orientations relative to the longitudinal axis of the work machine 10. It could also be replaced by a tangential or multi-drum threshing machine with subsequent straw walkers or separation rotors.

During operation, the crop processing device 24 threshes and separates the harvested crops. The grain and chaff fall through grates on the bottom of the crop processing device 24 into a cleaning system 26. The cleaning system 26 removes the chaff and conducts the clean grain to an elevator (not shown) for clean grain. The elevator for clean grain deposits the grain in a grain tank 28. The clean grain in the grain tank 28 can be conveyed to a truck or trailer through a discharging screw conveyor 30. Threshed straw separated from the grain is conducted from the crop processing device 24, through an output 32, and then to a discharging drum 34. The discharging drum 34 pushes the straw, in turn, to the back of the work machine 10 or conducts it to a straw chopper, not shown. The operation of the work machine 10 is controlled by the operator from an operator's cabin 35.

Height Control of the Element

The height control of the harvesting attachment 16, which, in the embodiment under consideration, is used as an example of an adjustable element of the work machine 10, is carried out by means of an actuator 48 in the form of a hydraulic cylinder, which adjusts the inclined conveyor 18, with the harvesting attachment 16 affixed thereon, up and down around the rotating axle of the upper deflection roller 74 of the inclined conveyor 18. The rotating axle is oriented horizontally and transverse to the forward direction V. The actuator 48 thus controls the distance between the harvesting attachment 16 and the ground. The actuator 48 is controlled by means of a control arrangement 42.

The desired (i.e. the commanded) height of the harvesting attachment 16 is specified by means of an operator interface 46 with user-manipulateable input elements such as keys or buttons. These keys or buttons are located on the upper end of a drive lever 44 (also known as a "quadrant lever", or "Hydro handle"). The drive lever 44 is mounted so the operator can grasp it and move it forward and backward to increase or decrease, respectively, the speed of the work machine 10 over the ground. In alternative arrangements, the operator interface 46 may include keyboards, touchscreens, knobs, dials, or other common means for communicating operator commands to a machine.

A height sensor 118 and/or a ground sensor 120, determine the actual height of the harvesting attachment 16 above the ground. In one arrangement, the height sensor 118 and the ground sensor 120 may comprise an elongate member fixed to a rotating sensing element in which the elongate member rests on the ground at one end and rotates the sensing element as the harvesting attachment 16 raises and lowers.

Alternatively, the height sensor 118 and the ground sensor 120 could also be replaced with a noncontact ranging sensor that determines the height of the harvesting attachment 16 above the ground by ultrasound, radar, or laser light.

Figure 2:
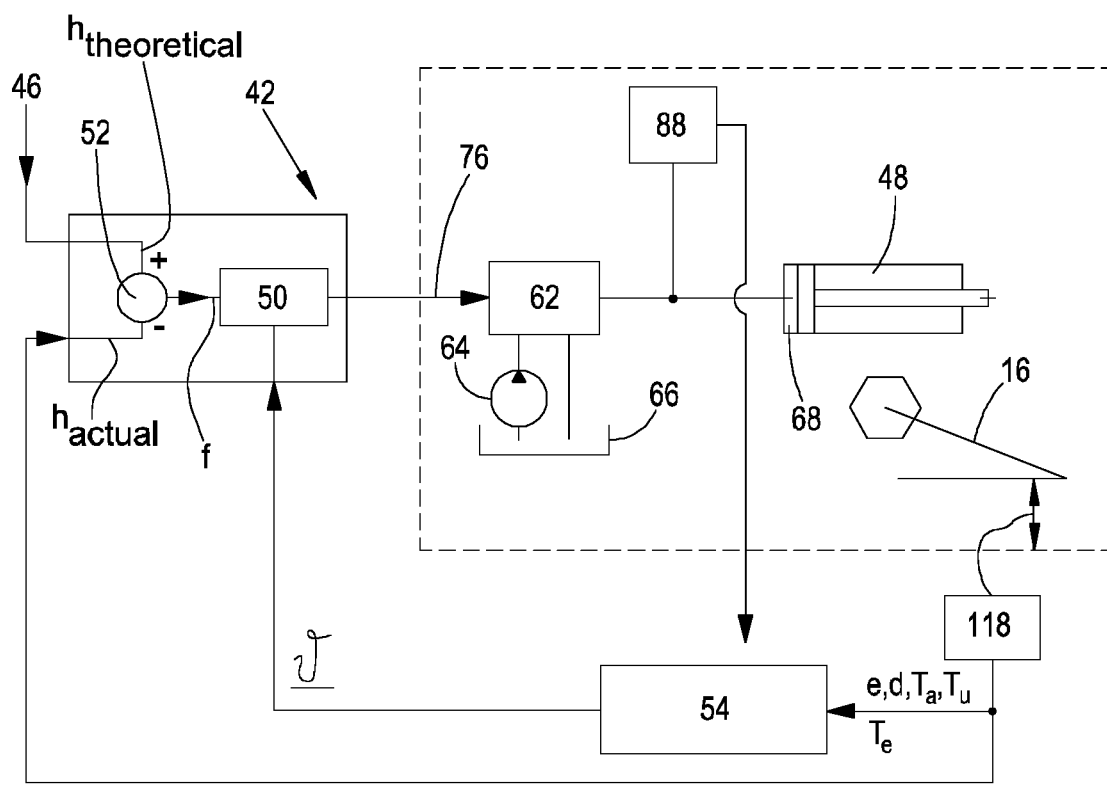
FIG. 2 is a schematic representation of a first embodiment of an arrangement to control an actuator for the adjustment of the adjustable element.

Reference is now made to FIG. 2, in which the control arrangement 42 is shown in detail. The control arrangement 42 comprises a control unit 50, which is connected to the operator interface 46 and the height sensor 118. During the operation, the control unit 50 continuously generates adjustment signals, which it transmits to an output 76. The control arrangement 42 preferably comprises an electronic circuit including an ALU, RAM, and ROM, which is configured by digital program steps stored in RAM and/or ROM to perform the functions described herein. Alternatively, the control arrangement 42 may be comprised of pneumatic and/or hydraulic circuit elements to perform the same functions.

These adjustment signals are calculated in such a way that the harvesting attachment 16 is driven to a height above the ground that corresponds, at least approximately, with the height specified with the operator interface 46. The signals of the height sensor 118 are used as feedback signals for the actual height ($h_{actual}$) and the signals of the operator interface 46, as the specification for the desired (theoretical) height ($h_{theoretical}$). A summing junction 52 combines the theoretical height and the actual height, calculates the difference between the theoretical height and the actual height, and passes on this difference as the height error to the control unit 50 as the input value to the control unit 50. The algorithm employed by the control unit to minimize this error is arbitrary. It may be, for example, a proportional controller (P), a proportional-integral controller (PI), a proportional-integral-differential controller (PID), a proportional-differential controller (PD), or a status regulator. In one arrangement, the functions of the summing junction 52 and the control unit 50 described herein are implemented as a series of programmed digital instructions that are stored in the control arrangement 42.

The output 76 of the control unit 50 is connected with a control device 62, which is an electrohydraulic unit with (proportional or pulse-width-modulated) valves which controls the position of the actuator 48 by controlling the flow of pressurized hydraulic fluid to and from the actuator 48.

The control device 62 is connected to a hydraulic pump 64, the piston space 68 of the actuator 48, and a hydraulic reservoir 66, from which reservoir the pump 64 is also supplied. The signals on the output 76 of the control unit 50, which are conducted to the control device 62, are lowering or raising signals. The signals on the output 76 are converted into corresponding control signals of their valves by the control device 62 in order to retract or extend the actuator 48 in reaction to the signals. The polarity and the height of the signal on the output 76 specifies the direction and speed of the adjustment of the actuator 48 and its length of time, the duration of the activation of the actuator 48.

With a position change and relocation of the harvesting attachment 16 (for example, the raising and lowering, and in another embodiment, also a lateral tilting), which can be the result of changes of the theoretical values of the position of the harvesting attachment 16 and/or its actual height, and with the control arrangement 42 shown in FIG. 2 using a control of the actuator 48, excitatory moments and excitatory forces arise, which are transferred to the work machine 10 standing on large-volume tires. As a result of the large-volume tires, the system consisting of the work machine 10 with the harvesting attachment 16 is thus excited to mechanical vibrations, which negatively influence the accuracy of the height level and the tilting of the harvesting attachment 16—relative to the ground. Depending on the type of excitatory forces and moments, the system consisting of the harvesting machine 10 and its harvesting attachment 16 is excited with vibrations of a different frequency, damping, and amplitude. To a special extent, resonance frequencies of the harvesting machine-attachment unit are also excited here, so that strong natural vibrations can arise. These vibrations are contrary to the goal of a constant cutting height of the crop and impair the result of the attachment height control unit.

In the state of the art, an operator interface 46 has been provided that permits the operator to adjust the regulating behavior of the control unit 50 to the actual circumstances. The machine operator can adjust the feedback gain of the control unit 50. In other words, he can adjust the amplification factor with which an error f on the output 76 of the control unit 50 that is carried out as a proportional controller is present in an amplified manner.

In practice, operators infrequently carry out this adjustment. When external conditions change, such as the grain tank 28 being filled or emptied or the ground firmness changing, this infrequent adjustment does not lead to an optimal regulating behavior of the control unit 50. Unless the operator frequently adjusts the feedback gain, the system may react very slowly to changes of the theoretical and/or actual height if the feedback gain is small. Further, if the feedback gain is too large, the system may overreact causing vibration and bouncing.

First Embodiment of a Determination Device for the Stipulation of Parameters of the Control Unit The control arrangement 42 of FIG. 2 comprises a determination device 54. In one arrangement, the determination device 54 is embodied as an electronic circuit comprising an ALU, RAM, and ROM, in which the RAM and/or ROM store digital instructions that configure the determination device 54 to perform the functions described herein. In another arrangement, the electronic circuit of the determination device 54 is separate from electronic circuit of the control unit 50. In another arrangement, a single electronic circuit is programmed to function as both the control unit 50 and the determination device 54.

The determination device 54 receives information indicating the adjustment signals of the actuator 48 from a pressure sensor 88. The pressure sensor 88 detects the pressure in the hydraulic fluid conduit that extends between the control device 62 and the piston chamber 68 of the actuator 48. And to which, on the other hand, the height determined with the height sensor 118 is sent. With the aid of the information regarding the adjustment signals of the actuator 48 and the corresponding reaction of the system consisting of the work machine 10 and the harvesting attachment 16, determined with the height sensor 118, the determination device 54 determines the variables describing the vibration behavior of the system consisting of the work machine 10 and the harvesting attachment 16, for example, the damping and the resonance frequency. By means of these variables, the determination device 54 specifies the parameters ϑ, which it sends to the control unit and which are used in the control unit 50 to specify control unit characteristics. If, for example, the control unit 50 is a proportional controller (P), then the determination device 54 can specify the feedback gain.

With a proportional-integral controller (PI) or a proportional-integral-differential controller (PID) or a proportional-differential controller (PD), the proportional fraction, the integral fraction, and/or the differential fraction to be used by the control unit 50 can be specified by the parameter set ϑ, or with a state regulator, a regulator matrix K. It would also be conceivable to use a root locus method to determine the parameter set ϑ, or that the control unit 50 comprise or implement a transfer function and that the parameter set ϑ comprise the coefficients of the transfer function.

Figure 3:
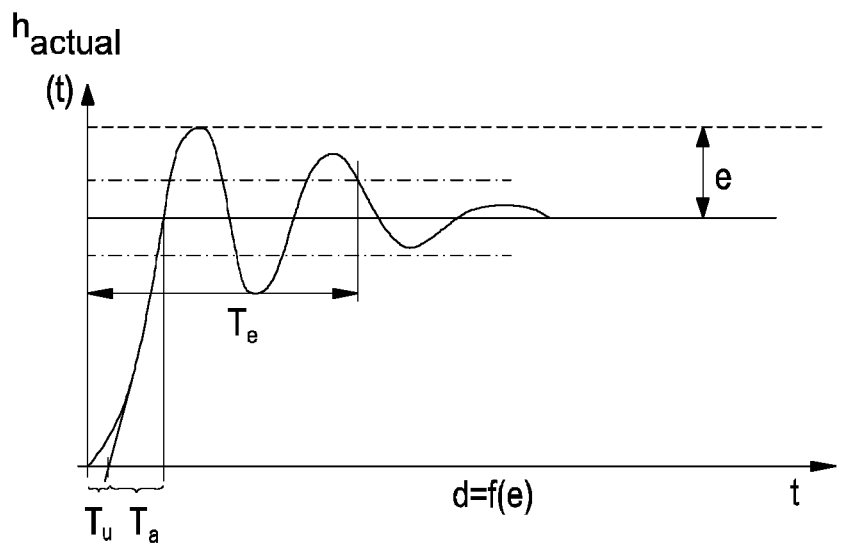
FIG. 3 is an example of a movement carried out by the adjustable element after the adjustment of the actuator, with the noted variables according to which the determination device optimizes the control unit.

As variables describing the vibration behavior of the system consisting of the work machine 10 and the harvesting attachment 16, the determination device 54 can, for example, evaluate, as a function of the time t, one or more variables shown in FIG. 3 with regard to the height $h_{actual}$, measured by the height sensor 118 and resulting as a reaction to a sudden (step-wise) adjustment of the actuator 48: harmonic range (e), damping (d), the increase time ($T_a$), the delay time ($T_u$), and the control unit time ($T_e$) (time to stay in a tolerance band) in the response of the system consisting of the work machine 10 and the harvesting attachment 16.

In the determination of the parameter ϑ, the determination device 54 can have recourse to a table or specified adjustment rules, for example, equations. Thus, the determination device 54 can check in a table as to which parameters ϑ—with the measured values of harmonic range (e), damping (d), increase time ($T_a$), delay time ($T_u$), and/or control unit time ($T_e$)—are to be delivered to the control unit 50, or equations suitable for the calculation of the parameters ϑ are used. The parameters are selected in such a way that the regulating behavior of the control unit 50 is optimized. One or more of the aforementioned variables, harmonic range (e), damping (d), the increase time ($T_a$), the delay time ($T_u$), and control unit time ($T_e$) can be optimized thereby.

In another embodiment, the determination device 54 of FIG. 2 can proceed iteratively or recursively in the specification of the parameters ϑ in that it changes the parameters ϑ gradually, determines the reaction to the regulating behavior of the control unit 50, and adapts the parameters as a function of the reaction in the sense of an improvement of the reaction, in particular one or more of the aforementioned variables, harmonic range (e), damping (d), increase time ($T_a$), delay time ($T_u$), and control unit time ($T_e$).

Second Embodiment

Figure 4:
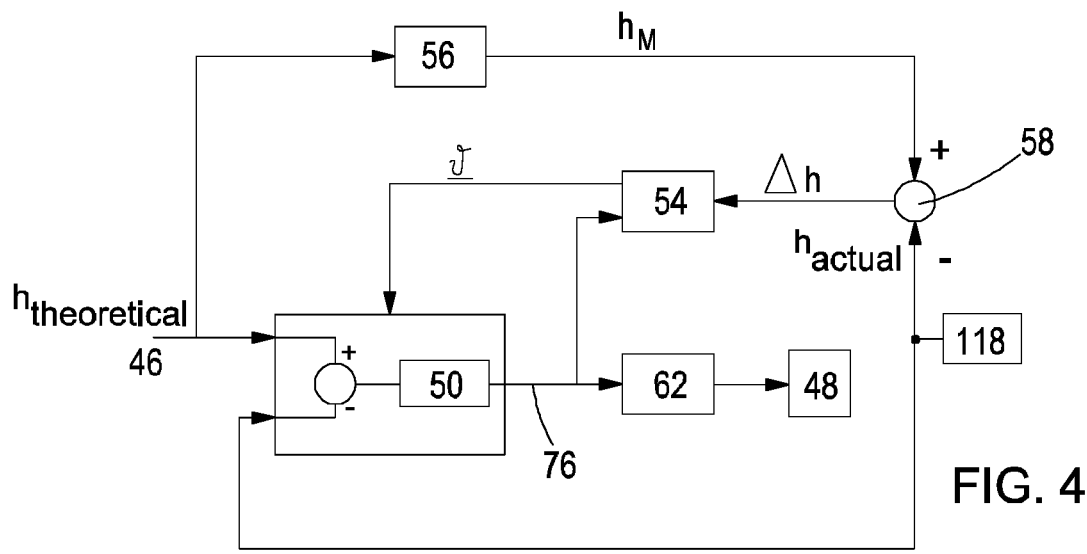
FIG. 4 is a schematic representation of a second embodiment of an arrangement for the control of an actuator for the adjustment of the adjustable element.

In the second embodiment of the control arrangement 42, shown in FIG. 4, elements corresponding to the first embodiment are marked with the same reference symbols. In this embodiment, the desired, ideal system behavior of the system consisting of the work machine 10 and the harvesting attachment 16 is described by a dynamic mathematical model 56 with the output $h_M$. The deviation between the ideal system behavior and the real system behavior $h_{actual}$ is compared, with one another, by a subtractor 58 and the error Δh is given to the determination device 54. This calculates the new parameter vector ϑ of the control unit 50, in the sense of minimizing the deviation of the real behavior from the ideal behavior.

Third Embodiment

Figure 5:
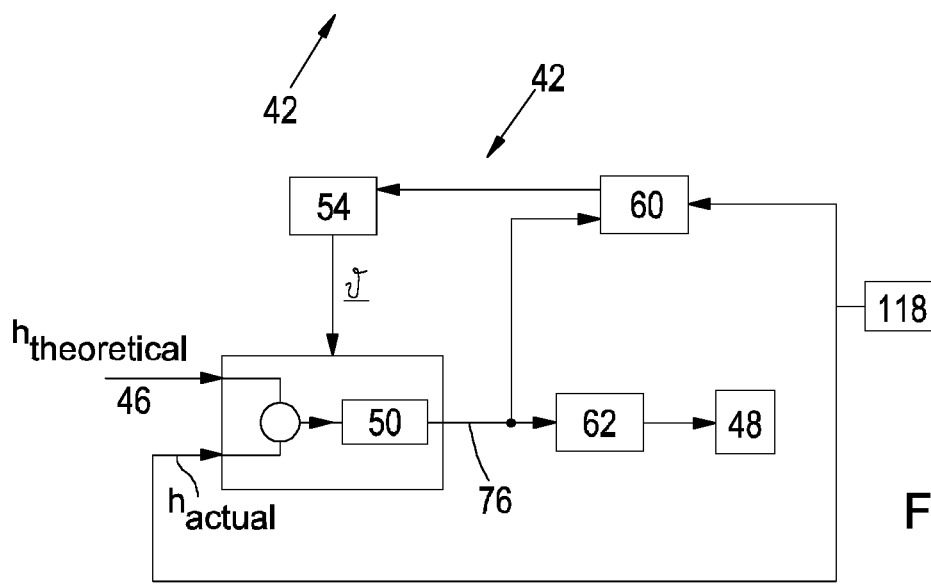
FIG. 5 is a schematic representation of a third embodiment of an arrangement for the control of an actuator for the adjustment of the adjustable element.

In the third embodiment of the control arrangement 42, shown in FIG. 5, elements corresponding to the first embodiment are marked with the same reference symbols. In this embodiment, an identification unit 60 is used, which determines the transfer characteristics of the control unit section, which consists of the control unit 62, the actuator 48, the system consisting of the work machine 10 and the harvesting attachment 16, and the height sensor 118, with the aid of an inlet signal (which is present on the output 76 of the control unit 50) and the output signal of the height sensor 118. With the aid of the transfer characteristics determined by the identification unit 60, the determination device 54 carries out a regulator design in accordance with known control unit-technical methods. The parameters ϑ of the control unit 50 are thus determined by an explicit controller design. A value representative for the transfer function of the control unit section can hereby be determined, a model identification can take place with the aid of this value, and a regulator design can be carried out with the model identification, whose parameters are used for the regulator.

Time When the Parameters are Made Available;
Signal Generator

Figure 6:
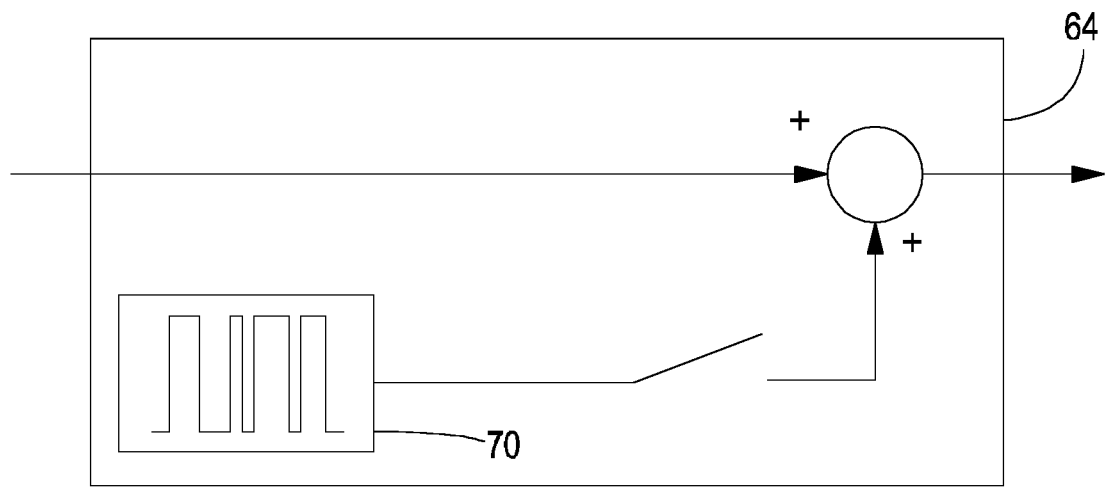
FIG. 6 is a generator for test signals.
Figure 7:
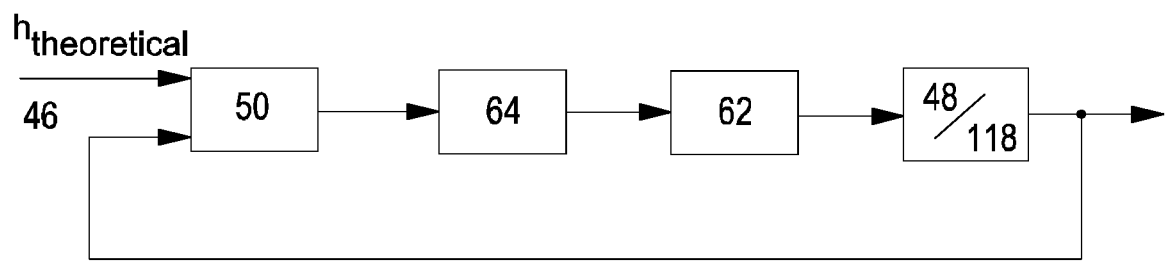
FIG. 7 is a first variant for the insertion of the generator of FIG. 6 into the arrangement.
Figure 8:
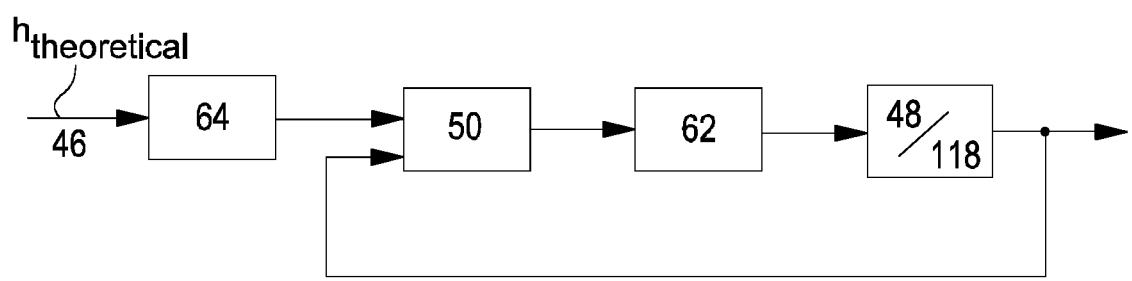
FIG. 8 is a second variant for the insertion of the generator of FIG. 6 into the arrangement.

The described adaptation of the parameters ϑ of the control unit does not take place only at the beginning of a harvesting process, but rather at regular or irregular intervals, so that it is possible to react to changing conditions, for example, when a grain tank 28 that is being filled or other soil characteristics change. In principle, it can take place during operation, at the headland, or during a calibration (initiated by the operator or automatically, for example, after a predetermined time has passed). The execution in the headland or during operation is preferred, however, since here an adaptation can regularly take place. If the adjustment signals on the output 76, appearing (in any case, provided with corresponding inputs of the operator or by an automatic control device) during operation, should not be sufficient for the determination device 54, then test signals can be produced from time to time with a device 64 with a signal generator 70, in accordance with FIG. 6, which either act on the section as in FIG. 7 or on the theoretical value in accordance with FIG. 8.

Fourth Embodiment

Figure 9:
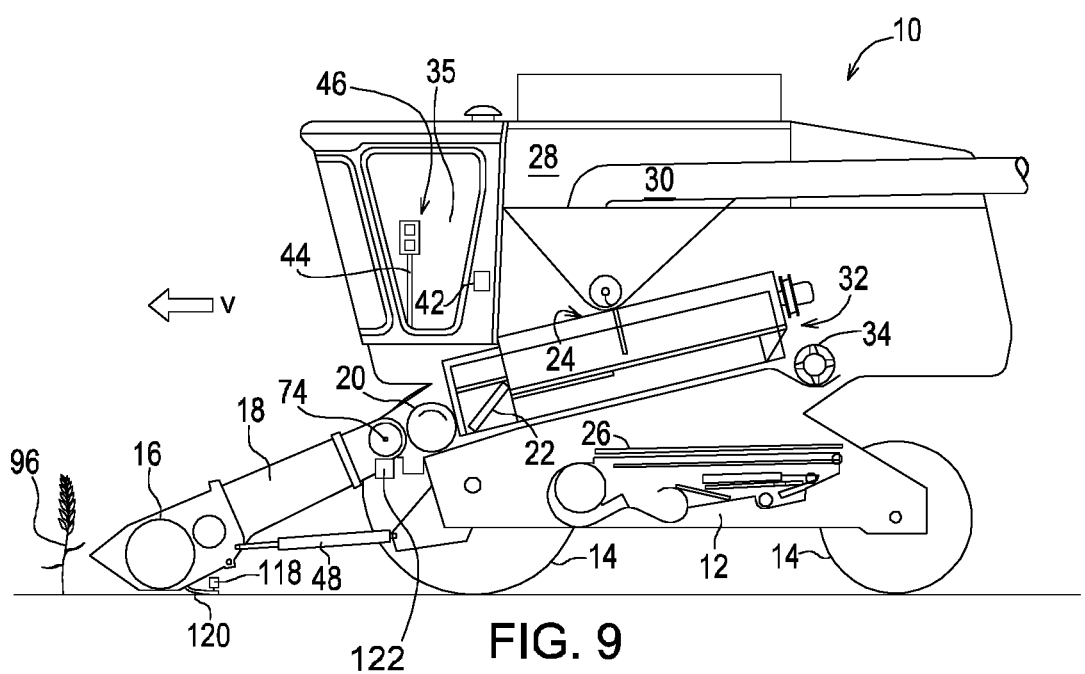
FIG. 9 is a schematic lateral view of a work vehicle with an adjustable element, on which a fourth embodiment of an arrangement is used to control the actuator for the adjustment of the adjustable element.
Figure 10:
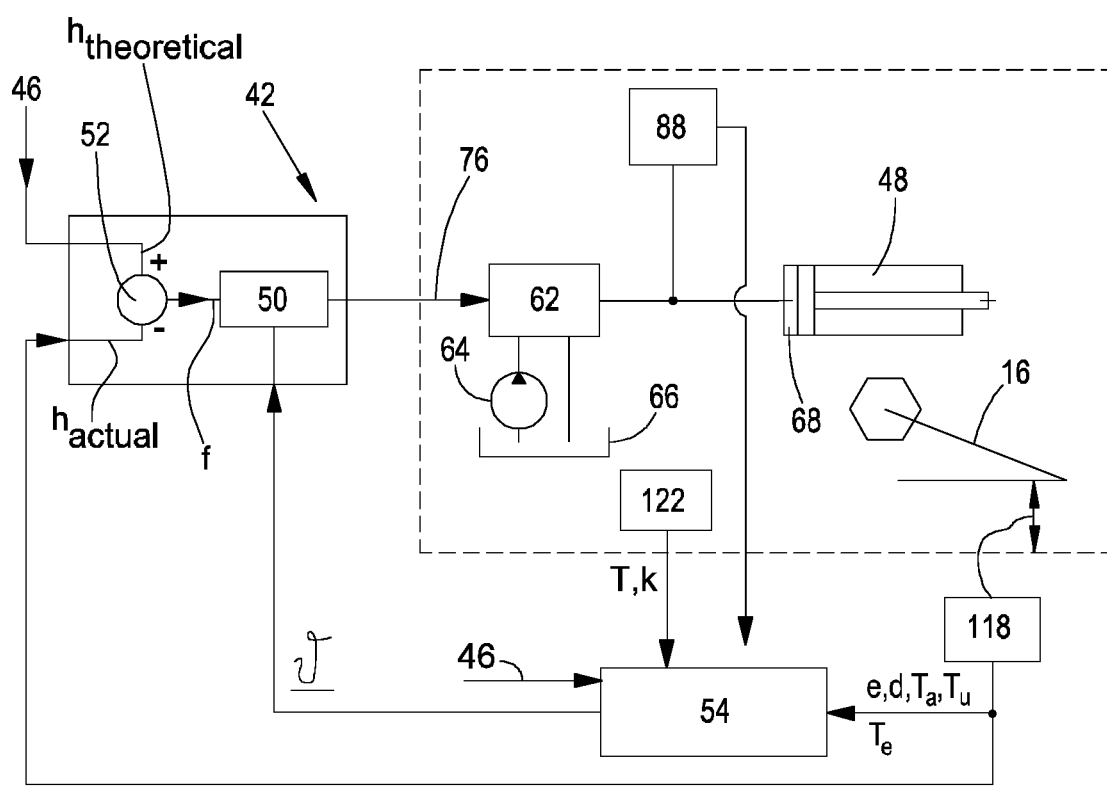
FIG. 10 is a schematic representation of a fourth embodiment of an arrangement for the control of an actuator for the adjustment of an adjustable element.

The fourth embodiment, shown in FIGS. 9 and 10, corresponds to the first embodiment according to FIGS. 1 and 2 but contains additional elements. The rotational position of the inclined conveyor 18, relative to the chassis 12 of the work machine 10, is determined by means of the rotational angle sensor 122, whose signals are conducted to the determination device 54. Instead of or additionally to the signals of the rotational angle sensor 122, one could also use to the signals of the height sensor 118, but the signals of the rotational angle sensor 122 are more reliable since they are independent of any ground unevenness.

The determination device 54 is also affected by the signals of the operator interface 46. During the (harvesting) operation, the determination device 54 monitors the signals of the operator interface 46 and if the signals of the operator interface 46 (or of an automatic control device, which, for example, automatically controls the work machine 10 at the headland—see EP 2 020 170 A1) comprise a rapid adjustment command, for example, when lifting the harvesting attachment 16 at the beginning of the headland, when lowering the harvesting attachment 16 while leaving the headland (that is, when the standing or lying crop is entered), or when changing between a normal harvesting operation of the crops ready for harvest to the taking up of downed grain, or vice versa, then the device will carry out an investigation of the reaction of the inclined conveyor 18 with respect to the aforementioned adjustment command. At the same time, the determination of the parameters $\vartheta$ that were discussed with regard to FIGS. 2, 4, and 5 can take place.

Figure 11:
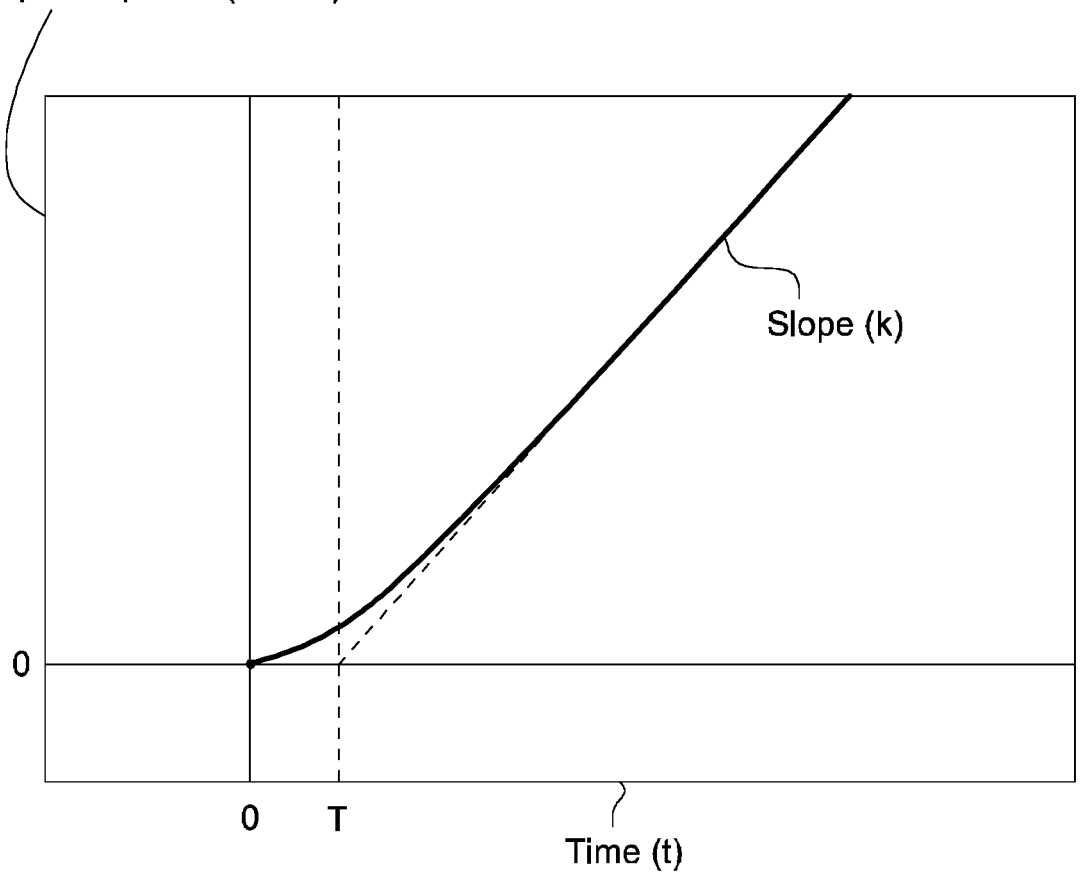
FIG. 11 is a representation of the course of the curve of a sensor for the detection of the signal recorded by a sensor as a function of the time used in the fourth embodiment to determine control unit parameters.

As represented in FIG. 11, with the dotted curve, the control device 62 and the actuator 48 react, in a time-delayed manner, with respect to the rapid adjustment command—that is, only after a delay time T will the rotational angle sensor 122 detect a reaction of the inclined conveyor 18. Subsequently, the inclined conveyor 18 will rotate upward or downward at a constant speed, which can be described by a slope k. The solid line of FIG. 11 shows, in simplified form, the time course of the rotational angle sensor signal after a rapid stimulation. Represented as dots are construction lines, which make clear how the time T is experimentally determined. The delay time T depends on, among other things, mechanical characteristics of the control device 62, the pump 64, and the actuator 48, and the intermediate conduits, whereas the slope k can depend on the aforementioned variables as well as on the type of the harvesting attachment (in particular its mass). Also, the temperature of the hydraulic oil can influence the delay time T and the slope k.

The delay time T and the slope k are, accordingly, regularly determined by the determination device 54—namely, right when the operator interface 46 inputs a rapid adjustment command. These two variables represent the reaction of the control device 62 and the actuator 48 with respect to the adjustment command of the operator interface 46. In the long run, this reaction also influences the movement of the inclined conveyor 18 and the height of the harvesting attachment 16 above the ground.

In the fourth embodiment, the determination device 54 makes use, after all this, of the fact that the hydraulic system (control device 62 and actuator 48) carries out a specific reaction with respect to a rapid command, which can be described, in the example under consideration, by the parameters delay time T and slope k. The hydraulics can thus be described by a model which can be approximated as a so-called IT1 element. The system, consisting of the work machine 10, inclined conveyor 18, and harvesting attachment 16, and the wheels 14, as represented above in the description of the first to the third embodiments, can be described by another model, in which, for example, it is a so-called PT2 element. The determination device 54 first determines, for both models and with the aid of measurements with the sensors 118 and 122, variables characterizing these models, as described above, and subsequently (based on the variables characterizing these models), the parameter set $\vartheta$, in such a way that taking into consideration the conceived or imaginary series circuit of the two models (for the hydraulic system, on the one hand, and the system consisting of the work machine 10, the inclined conveyor 18, the harvesting attachment 16, and the wheels 14, on the other hand), an optimizing of the behavior of the control unit 50 takes place, and in particular, harmonic range, time at rest, and control unit deviations remain at a tolerable level. This extent can be firmly specified in all embodiments of the document under consideration, or the operator can input them.

In the determination of the parameters T and k, one could also dispense with a measurement-technical determination of the reaction of the hydraulic system with respect to the rapid (step-wise) command and instead, determine the temperature of the hydraulic oil in the hydraulic circuit of FIG. 10. With the aid of the temperature of the hydraulic oil, it is possible to estimate the parameters T and k, for example, read them from a table. Also, one could simply provide only two parameter sets between which switching is carried out at a switching temperature.

OTHER EMBODIMENT POSSIBILITIES

Various modifications of the represented embodiments are possible. For example, an actuator (not shown) can be used to swivel the harvesting attachment 16, relative to the inclined conveyor 18, around an axle extending in the forward direction, in order to align it parallel to the ground (see WO 2008/088916 A2). This actuator would be managed by a control arrangement that is constructed and works analogously to those according to FIG. 2, 4, 5 or 10.

The detection of the vibration behavior of the system consisting of the harvesting attachment 16 and the work machine 10 need not absolutely be based only on the height sensor 118, but rather other sensors can also be used that detect the movement of the harvesting attachment 16 or the work machine 10, such as an inertia sensor on the inclined conveyor 18, or that detect variables influencing the vibration behavior, such as sensors for the determination of the content of the grain tank or the content of a fuel tank or the pressure of the tires. To this end, reference is made to the disclosure of DE 10 2014 203 005 B3, whose disclosure is incorporated in its entirety in the documents under consideration. With the aid of the vibration behavior, the parameter set $\vartheta$ is determined for the control unit 50.

A signal formation arrangement in accordance with DE 10 2014 203 005 B3 could be inserted between the output 76 of the control unit 50 and the control arrangement 62, in order to further improve the vibration behavior of the control unit section consisting of the control unit 62, the actuator 48, the system consisting of the work machine 10 and the harvesting attachment 16, and the height sensor 118.

In another embodiment, the adjustable element is a work device located on a front or rear power lift of a tractor or a height-adjustable spray rod of a self-propelled field sprayer and/or one that can swivel around an axle extending forward, or an ejection bend of a field chopper that can be adjusted around a vertical and/or a horizontal axle.

The invention claimed is:
1. An arrangement for the control of an actuator for the adjustment of
   a harvester header,
   comprising:
   a control unit to produce adjustment signals for a valve for the harvester header to move the harvester header to a nominal position;
   a control arrangement of the actuator,
   coupled with the harvester header,
   the actuator to receive the adjustment signals of the control unit;

a determination device to provide at least one controller gain parameter (ϑ), the at least one controller gain parameter determined from vibration characteristics of the system consisting of the harvester header and the work machine;

wherein the determination device is to automatically determine the at least one controller gain parameter (ϑ) at successive points M time in response to movement of the harvester header towards different nominal positions at the successive points in time and to send the at least one controller gain parameter ($) to the control unit and wherein the control unit outputs the adjustment signals based upon the at least one controller gain parameter (ϑ).

2. An arrangement according to claim 1, wherein the determination device is to determine the at least one parameter (ϑ) iteratively or recursively.

3. An arrangement according to claim 1, wherein the determination device to determine the parameter (ϑ) from one or more of the following determined variables of the vibration behavior of the harvester header and to determine the parameter (ϑ) for optimizing of one or more variables selected from a group of variables consisting of: the harmonic range (e), damping (d), the increase time (Ta), and/or the control unit time (Te) of the harvester header.

4. An arrangement according to claim 3, wherein the determination device is to determine, based upon one or more of the determined variables, the parameters of the control unit, using adjustment rules or tables.

5. An arrangement according to claim 1, wherein the determination device is to determine a deviation (Δh) between an ideal vibration behavior of the system consisting of the harvester header, which is described by a dynamic mathematical model (56), and the real vibration behavior of the system and the error resulting therefrom is used to calculate a parameter (ϑ) to minimize the deviation of the real behavior from the ideal behavior.

6. An arrangement according to claim 1, wherein the determination device is to determine, at least one variable of the control unit section, the at least one variable comprising a value representative for the transfer function of the control unit section, based upon the adjustment signal and a corresponding, determined adjustment of the harvester header.

7. An arrangement according to claim 1, wherein the determination device is to determine the at least one parameter in operation, at the headland, or during a calibration with rapid adjustment commands which appear during the operation and to supply the at least one controller gain parameter to the control unit.

8. An arrangement according to claim 1, wherein the determination device is to produce test signals from time to time and to superimpose the test signals on the adjustment signals or on the theoretical value for the position of the harvester header, supplied to the control unit.

9. An arrangement according to claim 1, wherein the determination device to take into consideration the reaction of the control arrangement and the actuator with respect to a rapid adjustment command in the determination of the at least one controller gain parameter (ϑ) based on a determination of the reaction of the actuator with respect to a rapid adjustment command or with the aid of an estimate of operating variables of the control arrangement and/or the actuator, the variables comprising the temperature of the hydraulic oil used there.

10. The arrangement of claim 1 further comprising:

a chassis supporting the harvester header;

a crop processing device;

a conveyor to convey crops from the harvesting attachment to the crop processing device; and at least one sensor to determine an actual height of the harvester header above ground.

11. The harvester of claim 1, wherein the successive points in time are selected from a group of successive points in time consisting of: the lifting of the harvesting header at a beginning of a head land and lowering of the harvesting header when leaving the head land and height adjustment of the harvesting header during travel of the harvester between head lands.

12. The harvester of claim 1, wherein the control arrangement is selected from a group of control arrangements consisting of: a proportional-integral controller, a proportional-integral-differential controller and a proportional-differential controller, wherein the controller gain parameter defines a proportional fraction, an integral fraction or a differential fraction of the control unit.

13. The harvester of claim 1, the control arrangement implements a transfer function and wherein the controller gain parameter comprises coefficients of the transfer function.

* * * * *